S. N. SORENSEN.
SMUT MACHINE.
APPLICATION FILED MAR. 9, 1910.
1,023,888.
Patented Apr. 23, 1912.
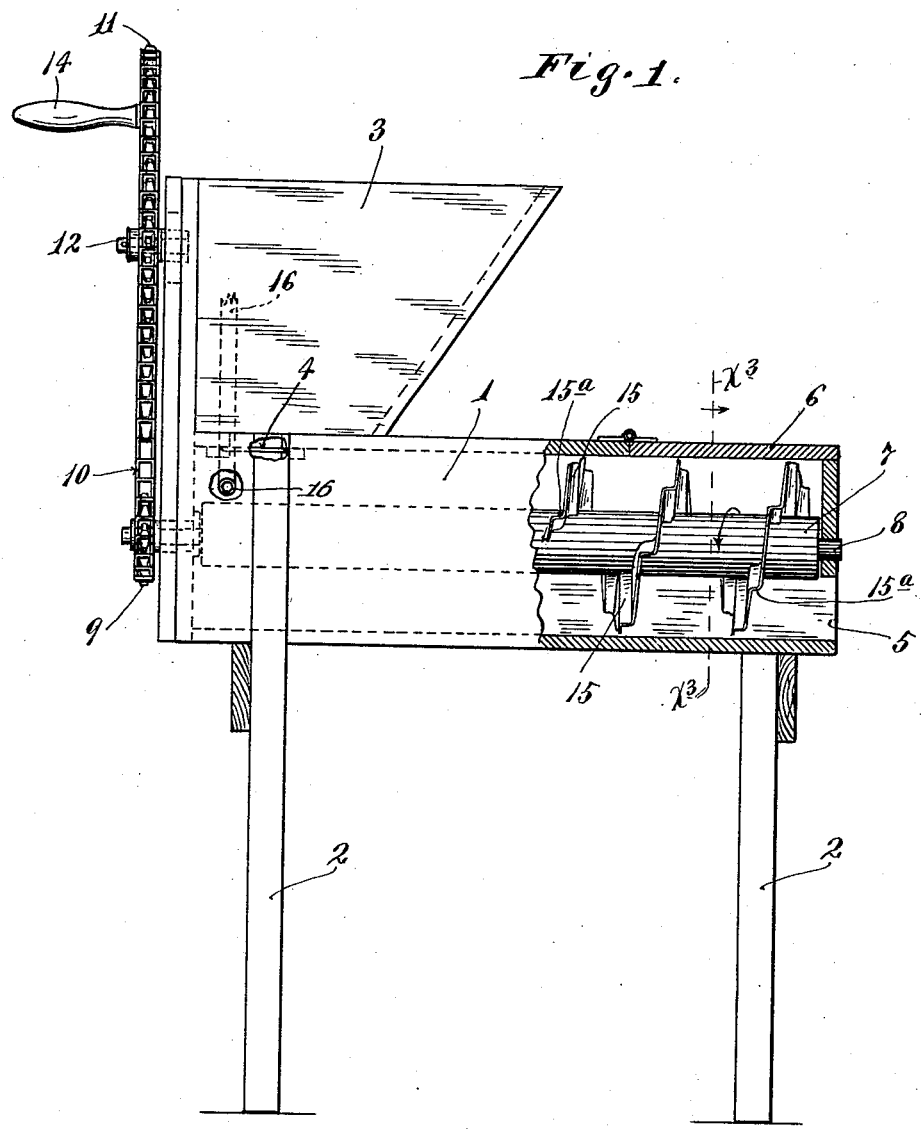
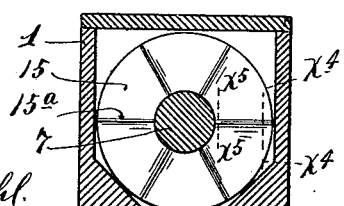
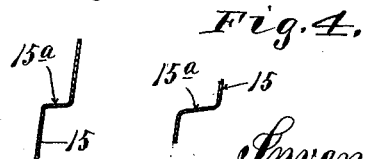

UNITED STATES PATENT OFFICE.

SEVERIN N. SORENSEN, OF MINNEAPOLIS, MINNESOTA.

SMUT-MACHINE.

1,023,888.  Specification of Letters Patent.  Patented Apr. 23, 1912.

Application filed March 9, 1910. Serial No. 548,138.

*To all whom it may concern:*

Be it known that I, SEVERIN N. SORENSEN, a citizen of the United States, residing at Minneapolis, in the county of Hennepin and State of Minnesota, have invented certain new and useful Improvements in Smut-Machines; and I do hereby declare the following to be a full, clear, and exact description of the invention, such as will enable others skilled in the art to which it appertains to make and use the same.

My invention is particularly directed to the provision of an extremely simple and highly efficient machine for removing smut or other germ formation from wheat, oats, flax, and other kinds of seeds; and to this end the invention consists of the novel devices and combinations of devices hereinafter described and defined in the claims.

As is well known, a solution of water and formaldehyde is customarily used in these so-called smut machines to destroy smut and kill diseased germs found on the seeds. It is of course highly important that this solution be applied economically or without waste, but at the same time very thoroughly and evenly so that it will reach all of the exterior parts of the grain or seeds. My improved machine accomplishes these desired results by simple construction, which, while of small first cost, is strong and durable.

In the accompanying drawings which illustrate the invention, like characters indicate like parts throughout the several views.

Referring to the drawings: Figure 1 is a side elevation of a machine with some parts broken away; Fig. 2 is a transverse section taken on the line $x^3$ $x^3$ of Fig. 1; Fig. 3 is a detail in section on the line $x^4$ $x^4$ of Fig. 2; and Fig. 4 is a detail in section on the line $x^5$ $x^5$ of Fig. 2.

The mixing box or body portion of the machine is in the form of an approximately horizontal closed trough 1 having a hopper like bottom and as shown, supported by legs 2. The grain or seed to be treated is introduced into a hopper 3 that is secured to the top and opens into the receiving end of trough 1 through a discharge orifice that is controlled by a gate 4 of the ordinary slide or of any suitable form not necessary for the purposes of this case to consider. At the lower portion of its delivery end the trough 1 is provided with a discharge passage 5 and as shown, the top of said trough is provided at the delivery end of the trough with a hinged section 6 adapted to be raised whenever desired.

Extending longitudinally through the trough 1 is a quite large roller 7 having trunnions preferably afforded by projecting shaft 8 that is journaled in the end plates of said trough. At its front end the roller shaft 8 is provided with a small sprocket 9. The sprocket chain 10 runs over sprocket 9 and a relatively large sprocket 11 which as shown, is journaled on a stud 12 projected from the upper portion of the hopper 3. The driving sprocket 11 is provided with an eccentrically located driving crank or hand piece 14 by means of which it may be rotated to thereby impart a relatively high speed of rotation to the roller 7.

For action on the grain or seeds within the trough 1 the roller 7 is provided with a spiral circumferentially stepped feed blade 15 rigidly secured to said roller at its inner edge and extending from end to end thereof. This feed blade 15 is preferably constructed from a single strip of sheet metal which is normally straight, but which is bent into a spiral circumferentially stepped form to afford the radially extended spirally off-set lifting shoulders 15$^a$.

In my first attempts to make this spiral blade from a straight or approximately straight strip of sheet metal, I encountered much difficulty, but this difficulty was overcome and the feeding and mixing action of the blade at the same time improved by giving materially greater lateral off-set to the shoulders 15$^a$ adjacent to the roller 7, and a materially decreased lateral off-set to the outer-most portions of the blade. See Figs. 4 and 5. Otherwise stated, the off-set of the lifting shoulders 15$^a$ decreases in a direction radially outward so as to give the greatest amount of gather to that edge of the blade forming strip which is to be placed adjacent to the roller 7.

The germ destroying solution may be introduced into the trough 1 by any suitable means, but as shown, it is delivered into the receiving end thereof through a supply pipe 16.

When the machine is in operation the roller 7 should be driven in the direction of the arrow marked thereof in Fig. 2 and this as is evident, will cause the spiral feed blade to continuously work the grain or seeds from the receiving or hopper end of the trough toward and through the discharge orifice 5 of said trough. All the while throughout this operation, the seed or grain will be lifted over and over again by the shoulders 15ª and hence will be very thoroughly commingled with the germ destroying solution.

What I claim is:

1. In a machine of the kind described, a conveyer comprising a roller or shaft and a surrounding continuous and unbroken spiral feed blade constructed from a strip of sheet metal bent at various intermediate points to form spirally offset radially extended lifting shoulders.

2. In a machine of the kind described, a conveyer comprising a roller or shaft and a surrounding continuous and unbroken spiral feed blade constructed from a strip of sheet metal bent at various intermediate points to form spirally offset radially extended lifting shoulders, which lifting shoulders decrease in width materially in a direction radially outward from the said roller or shaft.

In testimony whereof I affix my signature in presence of two witnesses.

SEVERIN N. SORENSEN.

Witnesses:
MARIE LA PALME,
HARRY D. KILGORE.

Copies of this patent may be obtained for five cents each, by addressing the "Commissioner of Patents, Washington, D. C."